(12) United States Patent
Harindranath

(10) Patent No.: US 8,504,060 B2
(45) Date of Patent: Aug. 6, 2013

(54) SYSTEM AND METHOD FOR REPORTING CHANGE OF AREA EVENT

(75) Inventor: Rajmohan Harindranath, Palakkad District (IN)

(73) Assignee: Infosys Limited (IN)

( * ) Notice: Subject to any disclaimer, the term of this patent is extended or adjusted under 35 U.S.C. 154(b) by 172 days.

(21) Appl. No.: 12/691,861

(22) Filed: Jan. 22, 2010

(65) Prior Publication Data

US 2011/0183682 A1 Jul. 28, 2011

(51) Int. Cl.
*H04W 24/00* (2009.01)
*H04W 4/00* (2009.01)

(52) U.S. Cl.
USPC ............... 455/456.1; 455/433; 455/456.3

(58) Field of Classification Search
USPC ................................................... 455/456.1
See application file for complete search history.

(56) References Cited

U.S. PATENT DOCUMENTS

| | | | |
|---|---|---|---|
| 2005/0044484 A1* | 2/2005 | Makela | 715/501.1 |
| 2005/0272445 A1* | 12/2005 | Zellner | 455/456.2 |
| 2006/0121917 A1* | 6/2006 | Shin | 455/456.5 |
| 2006/0293066 A1* | 12/2006 | Edge et al. | 455/456.3 |
| 2009/0049154 A1* | 2/2009 | Ge | 709/217 |
| 2009/0180422 A1* | 7/2009 | Bohacek et al. | 370/328 |
| 2009/0311992 A1* | 12/2009 | Jagetiya | 455/412.1 |
| 2010/0003976 A1* | 1/2010 | Zhu et al. | 455/433 |

* cited by examiner

*Primary Examiner* — Sam Bhattacharya
*Assistant Examiner* — Andy Gu
(74) *Attorney, Agent, or Firm* — Lerner, David, Littenberg, Krumholz & Mentlik, LLP

(57) ABSTRACT

The instant amendment is provided as a complete replacement to the amendment filed on Jul. 10, 2012. The instant amendment is submitted to correct a typographical error found in the previously-filed amendment. Claims 1 and 13 in the previously-filed amendment incorrectly recite "when it is determined by the MSC that a change of area event for the UE has occurred, forwarding a Subscriber Location Report (SLR) from the MSC to the VGMLC when it is determined by the MSC that a change of area event for the UE has occurred," whereas they should have recited "forwarding a Subscriber Location Report (SLR) from the MSC to the VGMLC when it is determined by the MSC that a change of area event for the UE has occurred," instead.

21 Claims, 2 Drawing Sheets

SYSTEM AND METHOD FOR REPORTING CHANGE OF AREA EVENT

BACKGROUND OF THE INVENTION

The present invention is directed towards providing location services to users in a communication network. More particularly, the present invention provides a system and method for reporting change of area event at the network side for an electronic communication device such as mobile phone for a predetermined location.

Electronic communication devices such as mobile phones are being widely used to facilitate wireless communication among users. Mobile phones use various mobile technologies such as Global System for Mobile Communication (GSM), Universal Mobile Telecommunication System (UMTS) and Code Division Multiple Access (CDMA) to serve users. Generally, mobile phones are used to provide call and messaging services to users. However, with advent of technology, mobile phones are also being used to provide location services to users.

Some mobile phones comprise Location Service (LCS) client to provide location services to users. LCS Client is a software and/or hardware entity that interacts with an LCS Server for obtaining location information of one or more mobile phones in a network. An LCS Client can generate two types of location service requests, immediate location request and deferred location request. When a user wants to know immediate location of a target mobile phone, LCS Client of the user generates an immediate location request.

In deferred location request, an LCS Client requests for location of a target mobile phone at a time of occurrence of one or more predefined events. An example of deferred location request is requesting for a location report when change of area event occurs for a target mobile phone for a predetermined location. Change of area event occurs for the target mobile phone when it enters/stays/leaves a predetermined location.

An LCS Client sends an LCS request to a target mobile phone for reporting change of area event for a predetermined location. The target mobile phone sends a location update report to the LCS Client when it enters/leaves/stays at the predetermined location. However, only those mobile phones can send a location update report to LCS Client in which change of area event technology is embedded. The change of area event technology is expensive and is not embedded in all existing mobile phones. Further, majority of old-fashioned mobile phones does not have change of area event technology. As a result, the above-mentioned mobile phones are not able to serve a request for a change of area event.

In light of the abovementioned disadvantages, there is a need for a method and system that facilitates reporting of change of area event for mobile phones which does not have change of area event functionality. Further, there is a need for a method and system that is capable of sending location update report to LCS Client whenever a change of area event occurs for the mobile phone using existing mobile networks. Furthermore, there is a need for a system and method where the change of area event can be supported at the network side irrespective of user equipment.

BRIEF SUMMARY OF THE INVENTION

A method for reporting change of area event is provided. The method comprises firstly receiving a Location Service (LCS) request from an LCS Client to report a change of area event for a User Equipment (UE) for a predetermined location. Secondly, obtaining an address of a Mobile Switching Center (MSC) associated with the predetermined location. Thirdly, establishing a connection with the MSC associated with the predetermined location. Thereafter, forwarding the LCS request to a Visited Gateway Mobile Location Center (VGMLC) associated with the MSC when the connection is established. Then, checking whether a change of area event has occurred for the UE by monitoring location update of the UE at the MSC. After that, sending a Subscriber Location Report (SLR) from the MSC to the VGMLC when the change of area event occurs for the UE. Finally, sending a location update report from the Home Gateway Mobile Location Center (HGMLC) to the LCS Client based on the SLR.

In an embodiment of the present invention, the change of area event occurs when the UE moves into the predetermined location. In another embodiment of the present invention, the change of area event occurs when the UE leaves the predetermined location. In yet another embodiment of the present invention, the change of area event occurs when the UE stays in the predetermined location.

In an embodiment of the present invention, the method further comprises a step of decoding the predetermined location into one or more cell identities and obtaining the address of the MSC serving one or more cells.

In an embodiment of the present invention, the method further comprises a step of checking whether the connection with the MSC is established. Secondly, sending a Provide Subscriber Location (PSL) request from the VGMLC to the MSC of the predetermined location. Thirdly, transmitting a PSL acknowledgement from the MSC of the predetermined location to the VGMLC. Next, checking whether a timer has timed out when the change of area event does not occur for the predetermined location. Further, indicating a failure of invocation of change of area event when the timer is timed out. In another embodiment of the present invention, a value of the timer is set by a user managing the LCS Client.

In an embodiment of the present invention, the method comprises a step of receiving a SLR acknowledgment at the MSC from the VGMLC of the predetermined location.

A communication network for reporting change of area event is provided. The communication network comprises a User Equipment (UE). The system further comprises an LCS Client that is configured to send an LCS request to report change of area event for a UE for a predetermined location. The system also comprise a Home Gateway Mobile Location Center (HGMLC) configured to receive the LCS request from the LCS Client, secure an address of a Mobile Switching Center (MSC) associated with the predetermined location, forward the LCS request to a Visited GMLC (VGMLC) associated with the MSC; and send a location update report to the LCS Client. The system further comprises an MSC associated with a predetermined location configured to check whether a change of area event has occurred for the UE by monitoring location update of the UE at the MSC and send a Subscriber Location Report (SLR) to the VGMLC when the change of area event occurs for the UE. In addition, the system comprises a VGMLC associated with the MSC which is configured to send the location update report to the HGMLC based on the SLR.

BRIEF DESCRIPTION OF THE DRAWINGS

The present invention is described by way of embodiments illustrated in the accompanying drawings wherein.

DETAILED DESCRIPTION

A system and a method for reporting change of area event in a communication network are described herein. The invention provides a change of area event functionality at the network side irrespective of the capability of the user equipment. The present invention also provides a means for utilizing existing cost effective communication networks and user equipments for reporting change of area event. The method of the invention may be provided on a computer readable medium.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that are known in the technical fields related to the invention have not been described in detail so as not to unnecessarily obscure the present invention.

The present invention would now be discussed in context of embodiments as illustrated in the accompanying drawings.

Figure 1:
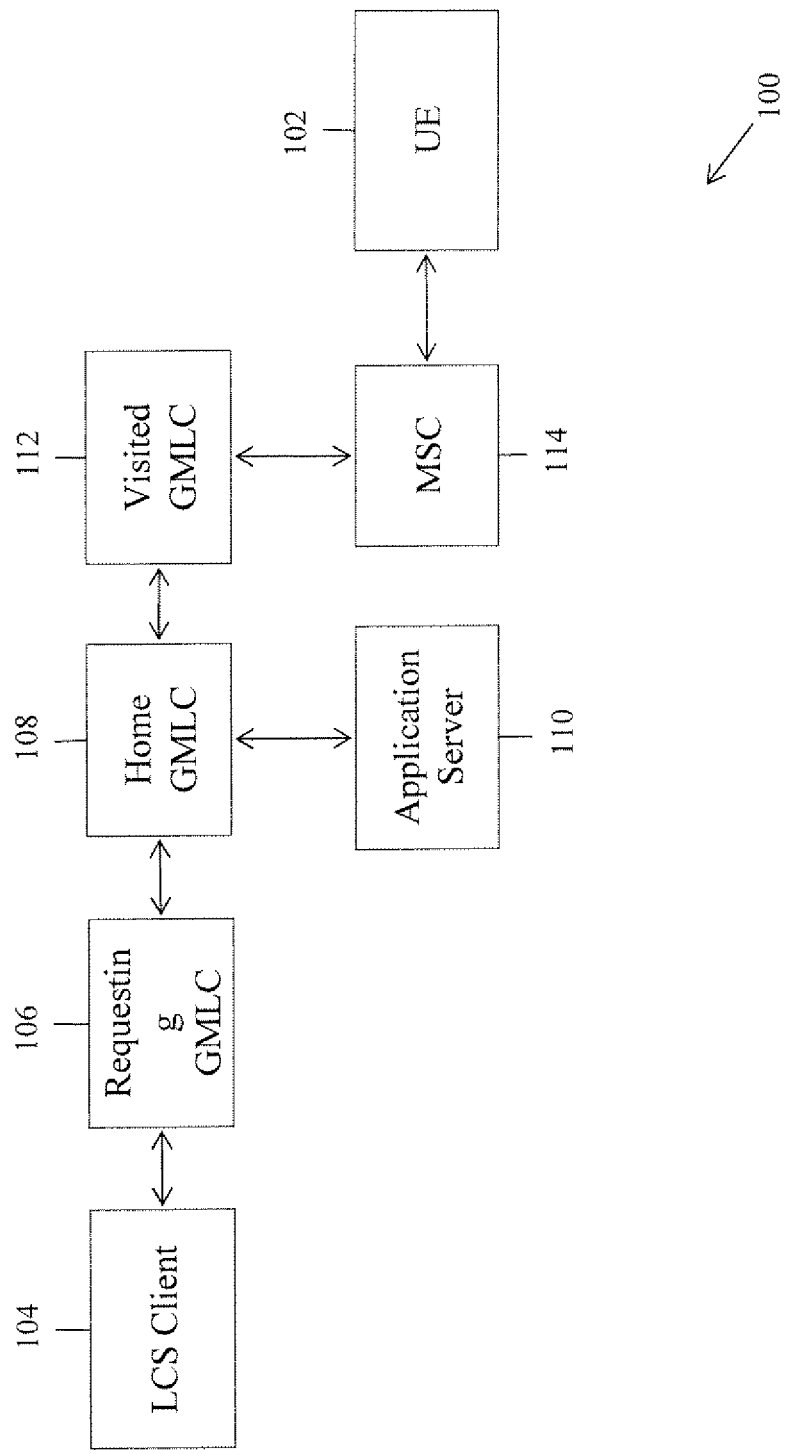
FIG. 1 illustrates a block diagram of a communication network for reporting change of area event for a user equipment.

FIG. 1 illustrates a block diagram of a communication network for reporting change of area event. Communication network 100 comprises user equipment (UE) 102, location services (LCS) client 104, a Requesting Gateway Mobile Location Center (RGMLC) 106, a Home GMLC (HGMLC) 108, an Application Server 110, a Visited GMLC (VGMLC) 112, and a Mobile Switching Center (MSC) 114.

Communication network 100 is a wireless network in which one or more electronic communication devices are interconnected to facilitate mobile communication amongst multiple users. Communication devices make use of various mobile technologies to provide mobile communication services to end users. Examples of mobile technologies include, but are not limited to, Global System for Mobile Communication (GSM) and Universal Mobile Telecommunication System (UMTS). In various embodiments of the present invention, communication network 100 may include multiple mobile networks. For example, a particular geographic area in a state may be served by AT&T and another geographic area may be served by Verizon Wireless.

Further, in a communication network 100, geographic locations are divided into small geographic units knows as cells. In various embodiments of the present invention, cell is represented by a cell identity (id) and a size of a cell can range from 50 meters to 20 kilometers in diameter. In another embodiment of the present invention, a single geographic location is represented by one or more cell ids based on the size of area it encompasses.

UE 102 is a portable electronic communication device used by an end user to communicate with other users in communication network 100. UE 102 provides call and messaging services to users and is generally carried by an end user. Examples of UE 102 include, but are not limited to, a mobile phone, hand-held device, blackberry, portable device or Personal Digital Assistant (PDA). In an embodiment of the present invention, UE 102 may reside either in its home network or a visited network. A home network of UE 102 is a mobile network to which UE 102 is subscribed/registered. When UE 102 visits a mobile network that is different from its home network, the mobile network is referred to as a visited network. For example, when UE 102 has home network as San Jose network, then Santa Clara network can be referred to as a visited network for UE 102.

LCS Client 104 is a software and/or hardware entity that resides within a computing unit and is capable of generating LCS requests for obtaining location information of UE 102. Examples of computing unit where LCS Client 104 may be installed include, but are not limited to, mobile phone, portable device, hand-held device, Personal Digital Assistant (PDA), laptop, and personal computer. In an embodiment of the present invention, LCS Client 104 generates an LCS request for receiving change of area event report for UE 102 for a predetermined location. The change of area event occurs for UE 102 when UE 102 enters or leaves a specific predetermined location.

In an embodiment of the present invention, reporting of change of area event may be implemented using single LCS Client and single UE. In another embodiment of the present invention, reporting of change of area event may be implemented using multiple LCS Clients and multiple UEs. In yet another embodiment of the present invention, reporting of change of area event may be implemented using single LCS Client and multiple UEs.

Communication network 100 may include multiple GMLCs such as RGMLC 106, HGMLC 108, and VGMLC 112. In various embodiments of the present invention, GMLC is a network device which supports LCS service functionality within a network. GMLCs are referred by different names according to their functionalities and placement in the network. For example, GMLC present in a home network of a UE 102 may be referred to as HGMLC 108, GMLC present in a visiting network of UE 102 may be referred to as VGMLC 112, and GMLC receiving LCS requests may be referred to as RGMLC 106. In an embodiment of the present invention, all the three GMLCs can be referred to as LCS Server.

RGMLC 106 is a first network device that LCS Client 104 access in communication network 100. RGMLC 106 receives all LCS requests generated by LCS Client 104 and acts as a gateway between LCS Client 104 and other networking elements in the communication network 100. In an embodiment of the present invention, RGMLC 106 is a GMLC for receiving the location request initiated by LCS Client 104 to UE 102.

HGMLC 108 resides in the home network of UE 102. When LCS Client 104 requests for an intimation of change of area event for UE 102, it is forwarded to HGMLC 108. In another embodiment of the present invention, HGMLC 108 is a GMLC to which the UE 102 is registered/subscribed.

Application server 110 is a specialized server that has the key responsibility of running specific applications within the communication network 100. In an embodiment of the present invention, the application server 110 interacts with a third party database to extract information related to subscribers of HGMLC 108. In another embodiment of the present invention, application server 110 stores a list of geopolitical names of locations, cell ids and MSCs of communication network 100. In yet another embodiment of the present invention, the application server 110 stores routing information pertaining to LCS requests for UE 102. In yet another embodiment of the present invention, application server 110 may be a Home Subscriber Server (HSS) or a Service Control Point (SCP).

VGMLC 112 is a network entity which serves UE 102 when it roams, enters or stays in a predetermined location for which 'change of area event' is sought. In an embodiment of the present invention, VGMLC 112 is the GMLC associated with the area where the UE 102 is located at a particular instance of time. In an exemplary embodiment of the present invention, the VGMLC 112 for UE 102 may be Santa Clara network when home network for UE 102 is San Jose network. In various embodiments of the present invention, 'LCS request' for reporting 'change of area event' is received by VGMLC 112 of the predetermined location.

MSC 114 is a network entity which works in agreement with VGMLC 112 and handles various call related and non-call related requests pertaining to UE 102, when it roams, enters or stays in a predetermined location for which 'change of area event' is sought. MSC 114 also performs various LCS functions such as charging and billing of LCS services, LCS co-ordination, its operation, and authorization. In various embodiments of the present invention, the conversion of geo-political name to Local Area Coverage (LAC)/Cell id is done at the MSC 114 itself. In another embodiment of the present invention, the geopolitical name is sent as a location request and the conversion to geopolitical name is done via third party database.

Operationally, LCS Client 104 sends an LCS request to RGMLC 106 for receiving change of area event report of UE 102 for a predetermined location. UE 102 is hereinafter referred to as a target UE. In an embodiment of the present invention, LCS request include information related to target UE such as mobile phone number, Subscriber Identity Module (SIM) information, service provider information etc. In another embodiment of the present invention, LCS request may include information related to target area/predetermined location such as location co-ordinates, geopolitical names etc. In yet another embodiment of the present invention, LCS request may include information related to type of change of area event.

The change of area event is generally of three types i.e. target UE enters predetermined location, target UE leaves predetermined location, and target UE stays in the predetermined location.

In various embodiments of the present invention, LCS request specifies that the change of area event has to be reported to LCS Client 104 when the target UE with a specific mobile number enters a predetermined location. For example, a mobile phone number may have home network in San Jose and the change of area event has to be reported to LCS Client 104 when the mobile phone number roams in a predetermined location of Santa Clara network.

In an embodiment of the present invention, LCS request may specify a predetermined time limit within which the change of area event has to be reported to an LCS Client 104. In another embodiment of the present invention, the user via LCS request may specify a time limit of three days. In yet another embodiment of the present invention, the LCS Client request may wait for the mobile phone for a predetermined time before it expires.

In various embodiments of the present invention, the LCS request may further specify a limit on number of times the change of area event has to be reported to LCS Client 104. If the change of area event has to be reported once, a location update report is sent to LCS Client 104 when first change of area event occurs for the target UE. If the change of area event has to be reported more than once, the LCS request may specify a minimum time interval between subsequent location update. In an exemplary embodiment of the present invention, the LCS request may specify the value of location update report as four and the minimum time interval between each report as one hour.

Once a request has been received by RGMLC 106 from LCS Client 104, it is forwarded to HGMLC 108. The request from HGMLC 108 is further transmitted to application server 110 for securing an address of Mobile Switching Center (MSC) 114 associated with the predetermined location.

In operation, the application server 110 decodes the geopolitical name of the predetermined location. The application server 110 then searches for MSCs that can serve the target UE at the predetermined location. When a specific MSC is found suitable to serve target UE, the application server 110 returns an address of MSC 114 to HGMLC 108. In an embodiment of the present invention, the address of MSC 114 may also include routing information to MSC 114 for LCS request.

The address of MSC 114 received by HGMLC 108 is further forwarded to VGMLC 112 associated with the MSC 114 of the predetermined location. VGMLC 112 and MSC 114 work together to enable MSC 114 in accomplishing LCS requests. Once a connection is established with the VGMLC 112 of the predetermined location, HGMLC 108 forwards the LCS request to VGMLC 112. As soon as VGMLC 112 receives the LCS request, it sends a Provide Subscriber Location (PSL) request to MSC 114.

In an embodiment of the present invention, PSL is used to retrieve the state of the target UE and location information. In another embodiment of the present invention, PSL request may include a reference number and HGMLC 108 address. In yet another embodiment of the present invention, PSL is a message which LCS Client 104 may invoke to get the location of the user.

MSC 114 on receiving the location information converts the location to appropriate cell ids associated with it. An event is armed inside the MSC 114 for those cell ids to send an SLR if the user enters a specific cell id. MSC 114 then sends a PSL Acknowledgement (Ack) to VGMLC 112 in response to the PSL request. PSL Ack indicates that MSC 114 has received the PSL request and shall provide with the target UE updates as soon as it enters the vicinity of the predetermined location.

In various embodiments of the present invention, the target UE updates its location in MSC 114, whenever it enters the cells covered by MSC 114 of the predetermined location. The method of updating location information in MSC 114 by the target UE is a fundamental feature of mobile communication services and is present in all existing UEs. In an embodiment of the present invention, if the predetermined location is covered by more than one cell then the first cell where the target UE entered is considered by MSC 114 for updating change of area event. In yet another embodiment of the present invention, if the predetermined location is covered by congested cells then also a first preference cell id is selected by the MSC 114 and is conveyed to MSC 114 via BSS.

As soon as target UE updates its location, MSC 114 provides a Subscriber Location Report (SLR) to VGMLC 112. In an embodiment of the present invention, SLR report may include the identity of the cell in which target UE has entered, the time of entry, MSC 114 address etc. In another embodiment of the present invention, SLR may include the reference number and HGMLC 108 address that was included in the PSL request. In yet another embodiment of the present invention, SLR may also include the address of new MSC's that are available in the vicinity and can serve predetermined location.

VGMLC 112 on receiving SLR sends an acknowledgment to MSC 114 and then provides a location update report to HGMLC 108 on the basis of the SLR. HGMLC 108 then sends an LCS service response to LCS Client 104 in the form of location update report. Finally, LCS Client 104 receives a location update report even when the change of area technology is not embedded in target UE. In an embodiment of the present invention, VGMLC 112 may reissue a location request if the address of the new MSC was forwarded in the SLR request.

In various embodiments of the present invention, MSC 114 waits for a predetermined time for receiving a location update from the target UE. When the target UE does not enter the predetermined location/cell within the predefined time limit, MSC 114 sends a SLR to VGMLC 112 reporting failure of invocation of change of area event for the predetermined location.

Figure 2:
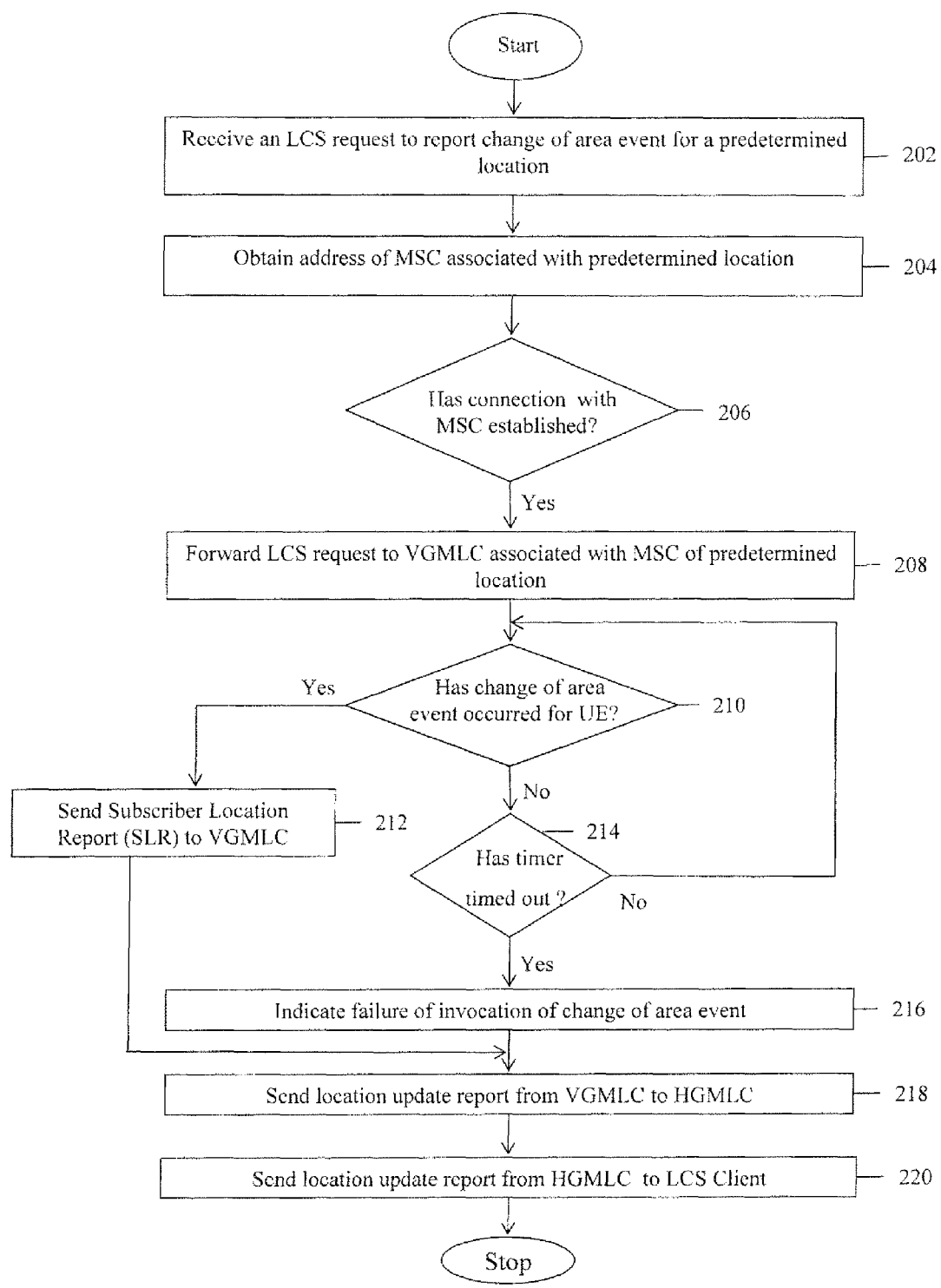
FIG. 2 is a flowchart illustrating a method of reporting change of area event for a UE for a predetermined location.

FIG. 2 illustrates a method for reporting change of area event for a UE for a predetermined location.

At step 202, an LCS request is received from an LCS Client to report change of area event for the UE for the predetermined location. At step 204, an address of MSC associated with the predetermined location is obtained and a connection with the MSC is established. In various embodiment of the present invention, the predetermined location is further decoded into one or more cell ids and the address of MSC that serves those cell ids is obtained.

At step 206, a check is performed to ensure whether the connection with the MSC associated with the predetermined location is established. If the connection with the MSC is established, at step 208, the LCS request is forwarded to the VGMLC associated with the MSC of the predetermined location. In various embodiments of the present invention, VGMLC keeps on sending Provide Subscriber Location (PSL) request to the MSC of the predetermined location. In another embodiment of the present invention, PSL acknowledgements are transmitted from MSC of the predetermined location to VGMLC of the predetermined location.

At step 210, another check is performed to ensure whether a change of area event has occurred for the UE. In various embodiments of the present invention, the MSC monitors location update of the UE and checks the occurrence of the change of area event. In an embodiment of the present invention, the change of area event occurs when the UE enters into the predetermined location. In another embodiment of the present invention, the change of area event occurs when the UE leaves the predetermined location. In yet another embodiment of the present invention, the change of area event occurs when the UE stays in the predetermined location.

If the change of area event has not occurred for the UE, then at step 214, location of the target UE is updated at the MSC of the predetermined location and a check is performed to ensure whether a timer has timed out. In various embodiments of the present invention, value of the timer is set by the user managing the LCS Client. If the timer has not timed out, then steps 202-210 are repeated. If the timer has timed out, then at step 216, MSC of the predetermined location sends a message indicating a failure of invocation of change area event for the UE for the predetermined location.

If a change of area event has occurred for the UE, then at step 212, a Subscriber Location Report (SLR) is sent to the VGMLC of the predetermined location. In an embodiment of the present invention, SLR includes the location update details of the UE at a time of occurrence of change of area event. In another embodiment of the present invention, a SLR acknowledgement is received from the VGMLC of the predetermined location by the MSC of the predetermined location.

At step 218, VGMLC of the predetermined location sends a location update report to HGMLC. In various embodiments of the present invention, the location update report is based on the SLR. Finally at step 220, HGMLC sends the location update report to the LCS Client about the change of area event for the UE.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A method for reporting change of area event, the method comprising the steps of:
   receiving a Location Service (LCS) request from an LCS Client that specifies a change of area event for a User Equipment (UE) for a predetermined location;
   obtaining an address of a Mobile Switching Center (MSC) associated with the predetermined location, the predetermined location being covered by a plurality of cells and each cell being represented by a corresponding cell id;
   establishing a connection with the MSC associated with the predetermined location;
   forwarding the LCS request to a Visited Gateway Mobile Location Center (VGMLC) associated with the MSC when the connection is established;
   triggering an armed event, inside the MSC, in response to the UE entering a selected cell of the plurality cells, wherein the armed event corresponds to sending a Subscriber Location Report (SLR);
   receiving, by the MSC, one or more location updates transmitted by the UE, each location update indicating a current location of the UE;
   determining, by the MSC, whether the change of area event that is specified in the LCS request has occurred,
   the determination by the MSC being based on the one or more location updates indicating the UE entering the selected and the triggering of the armed event, and wherein the MSC considers the selected cell for determining whether the change of area event has occurred based on the selected cell being the first of the plurality of cells that the UE entered;
   sending the SLR to the VGMLC reporting a failure of the change of area event when the UE does not enter the selected cell within a predetermined time limit; and
   sending, by the MSC, the SLR to the VGMLC based on a determination by the MSC that a change of area event for the UE has occurred.

2. The method of claim 1, wherein the change of area event further occurs when the UE leaves the predetermined location.

3. The method of claim 1, wherein the change of area event further occurs when the UE stays in the predetermined location.

4. The method of claim 1 further comprising the steps of:
   decoding the predetermined location into one or more cell identities (ids); and
   obtaining the address of the MSC serving one or more cell ids.

5. The method of claim 1 further comprising the step of checking whether the connection with the MSC is established.

6. The method of claim 1 further comprising the step of sending a Provide Subscriber Location (PSL) request from the VGMLC to the MSC of the predetermined location.

7. The method of claim 6 further comprising the step of transmitting a PSL acknowledgement from the MSC of the predetermined location to the VGMLC.

8. The method of claim 1 further comprising the step of checking whether a timer has timed out when the change of area event does not occur for the predetermined location.

9. The method of claim 8, wherein a value of the timer is set by a user managing the LCS Client.

10. The method of claim 8 further comprising the step of indicating a failure of invocation of change of area event when the timer has timed out.

11. The method of claim 1, further comprising:
   identifying, by the MSC, one or more cells that correspond to the predetermined location;
   wherein a location update is sent to the MSC by the UE when the UE enters a cell covered by the MSC; and
   wherein the occurrence of a change of area event is detected based on the UE entering the cell covered by the MSC.

12. The method of claim 1 further comprising the step of receiving a SLR acknowledgment at the MSC from the VGMLC of the predetermined location.

13. A communication network for reporting change of area event, the communication network comprising:
   a User Equipment (UE);
   a Location Services (LCS) client configured to:
      send an LCS request that specifies a change of area event for the UE for a predetermined location;
   a Home Gateway Mobile Location Center (HGMLC) configured to:
      receive the LCS request from the LCS Client;
      secure an address of a Mobile Switching Center (MSC) associated with the predetermined location;
      forward the LCS request to a Visited GMLC (VGMLC) associated with the MSC; and
      send a location update report to the LCS Client;
   an MSC associated with the predetermined location configured to:
      trigger an armed event for a selected cell of the plurality of cells, the armed event corresponding to the sending a Subscriber Location Report (SLR) when the UE enters the selected cell;
      receive one or more location updates from the UE, each location update identifying a current location of the UE;
      determine whether the change of area event that is specified in the LCS request has occurred, the determination by the MSC being based on a selected location update of the one or more location updates indicating entrance of the UE in the selected cell and the triggering of the armed event, wherein the MSC considers the selected cell for determining whether the change of area event specified in the LCS request has occurred based on the selected cell being the first of the plurality of cells that the UE entered;
      send the Subscriber Location Report (SLR) to the VGMLC when it is determined by the MSC that a change of area event for the UE has occurred; and
      send the SLR to the VGMLC reporting a failure of the change of area event when the UE does not enter the selected cell within a predetermined time limit; and
   a VGMLC associated with the MSC configured to:
      send the location update report to the HGMLC based on the SLR.

14. The communication network of claim 13 further comprising an application server configured to
   decode geopolitical name of the predetermined location; and
   return an address of the MSC serving the predetermined location.

15. The communication network of claim 13, wherein the VGMLC is further configured to
   send a Provide Subscriber Location (PSL) request to the MSC of the predetermined location; and
   send a SLR acknowledgement to the MSC.

16. The communication network of claim 15, wherein the MSC is further configured to transmit a PSL acknowledgement to the VGMLC.

17. The communication network of claim 13 further comprising a Requesting GMLC (RGMLC) configured to receive at least one or more LCS request generated by the LCS Client.

18. The communication network of claim 13, wherein the HGMLC is an LCS Server.

19. The communication network of claim 13, wherein the UE is an electronic communication device.

20. The communication network of claim 13, wherein the UE is one of the following: a mobile phone, a hand held device, a personal digital assistant, or a blackberry.

21. A method for reporting change of area event in a communications network, the method comprising:
   receiving, at a Mobile Switching Center (MSC) that is part of the communications network, a Location Service (LCS) request, the request specifying a change of area event for a User Equipment (UE) for the predetermined location, the predetermined location being covered by a plurality of cells and each cell being represented by a corresponding cell id;
   receiving, by the MSC, one or more location updates transmitted by the UE, each update indicating a current location of the UE;
   triggering an armed event, inside the MSC, for a selected cell of the plurality of cells, the armed event corresponding to sending a Subscriber Location Report (SLR) when the UE enters the selected cell;
   determining, by the MSC, whether the change of area event that is specified in the LCS request has occurred, the determination by the MSC being based on an entrance of the UE in the selected cell and the triggering of the armed event;
   sending, by the MSC, the SLR to another device, when it is determined that a change of area event for the UE has occurred; and
   sending the SLR to the another device reporting a failure of the change of area event when the UE does not enter the selected cell within a predetermined time limit.

* * * * *